US012764556B2

(12) United States Patent
Kim et al.

(10) Patent No.: US 12,764,556 B2
(45) Date of Patent: Oct. 13, 2026

(54) TECHNIQUES FOR EFFICIENT END-TO-END MACHINE LEARNING IN MULTI-USER SYSTEMS

(71) Applicant: Lenovo (Singapore) Pte. Ltd., Singapore (SG)

(72) Inventors: Junghoon Kim, Chicago, IL (US); Venkata Srinivas Kothapalli, Ottawa (CA)

(73) Assignee: Lenovo (United States) Inc., Morrisville, NC (US)

( * ) Notice: Subject to any disclaimer, the term of this patent is extended or adjusted under 35 U.S.C. 154(b) by 286 days.

(21) Appl. No.: 18/744,379

(22) Filed: Jun. 14, 2024

(65) Prior Publication Data

US 2025/0386209 A1 Dec. 18, 2025

(51) Int. Cl.
*H04W 4/00* (2018.01)
*H04W 16/22* (2009.01)

(52) U.S. Cl.
CPC .................................. *H04W 16/22* (2013.01)

(58) Field of Classification Search
CPC .................................................... H04W 16/22
See application file for complete search history.

(56) References Cited

U.S. PATENT DOCUMENTS

2022/0020195 A1* 1/2022 Kuta .................... G06V 40/168
2022/0020197 A1* 1/2022 Kuta .................... G06V 40/171
2022/0261433 A1* 8/2022 Zhang .................... G06F 16/51
2022/0366236 A1* 11/2022 Mesmakhosroshahi .................... G06N 3/09
2023/0108177 A1* 4/2023 Li .......................... G06N 3/08 706/12
2023/0276480 A1* 8/2023 Marzban ................ G06N 3/045 370/329
2023/0316082 A1* 10/2023 Mishra .................... G06N 3/09
2025/0005379 A1* 1/2025 Tang ........................ G06N 3/04
2025/0203400 A1* 6/2025 Stefanatos ............. G06N 3/084
2025/0226859 A1* 7/2025 Chai .................... H04B 7/0456
(Continued)

FOREIGN PATENT DOCUMENTS

WO WO-2025208452 A1 * 10/2025 ............ H04W 16/22

OTHER PUBLICATIONS

E. Dahlman et al., "5G NR: The next generation wireless access technology" Academic Press, 2020, Google Books, p. 1.
(Continued)

*Primary Examiner* — Thai Dinh Hoang
(74) *Attorney, Agent, or Firm* — Kunzler Needham Hilton

(57) ABSTRACT

Various aspects of the present disclosure relate to storing a ML model and a set of ML parameters associated with the ML model. Aspects of the present disclosure relate to generating a first and second sets of forward-pass values based on perturbations of the set of ML parameters by a random vector in a positive direction and a negative direction, respectively. Aspects of the present disclosure relate to transmitting, to a set of UEs, a set of training messages containing the first and second sets of forward-pass values, and receiving a set of loss difference values, each associated with a UE of the set of UEs. Aspects of the present disclosure relate to determining a model update decision based on the set of loss difference values and transmitting, to the set of UEs, an update message indicating the model update decision.

20 Claims, 8 Drawing Sheets

(56) References Cited

U.S. PATENT DOCUMENTS

| | | | | |
|---|---|---|---|---|
| 2025/0292159 | A1* | 9/2025 | Collado Umana | G06N 20/00 |
| 2025/0351026 | A1* | 11/2025 | Purkayastha | H04W 36/0079 |
| 2025/0371659 | A1* | 12/2025 | Sharma | G06T 3/4046 |

OTHER PUBLICATIONS

S. Dörner et al., "Deep Learning Based Communication Over the Air," in IEEE Journal of Selected Topics in Signal Processing, vol. 12, No. 1, pp. 132-143, Feb. 2018.
J. Hoydis et al., "Toward a 6G AI-Native Air Interface," in IEEE Communications Magazine, vol. 59, No. 5, pp. 76-81, May 2021.
X. Lin et al., "An overview of the 3GPP study on artificial intelligence for 5G new radio," arXiv preprint arXiv:2308.05315 pp. 1-7, (2023).
S. Malladi et al. "Fine-tuning language models with just forward passes." Advances in Neural Information Processing Systems 36 pp. 1-38 (2023).
H. Naveed et al. "A comprehensive overview of large language models." arXiv preprint arXiv:2307.06435 pp. 1-46, Apr. 11, 2024.
T. O'shea et al., "An Introduction to Deep Learning for the Physical Layer," in IEEE Transactions on Cognitive Communications and Networking, vol. 3, No. 4, pp. 563-575, Dec. 2017.

* cited by examiner

TECHNIQUES FOR EFFICIENT END-TO-END MACHINE LEARNING IN MULTI-USER SYSTEMS

TECHNICAL FIELD

The present disclosure relates to wireless communications, and more specifically to techniques for end-to-end machine learning (ML) in multi-user systems.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like)). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

SUMMARY

An article “a” before an element is unrestricted and understood to refer to “at least one” of those elements or “one or more” of those elements. The terms “a,” “at least one,” “one or more,” and “at least one of one or more” may be interchangeable. As used herein, including in the claims, “or” as used in a list of items (e.g., a list of items prefaced by a phrase such as “at least one of” or “one or more of” or “one or both of) indicates an inclusive list such that, for example, a list of at least one of A, B, or C means A or B or C or AB or AC or BC or ABC (i.e., A and B and C). Also, as used herein, the phrase “based on” shall not be construed as a reference to a closed set of conditions. For example, an example step that is described as “based on condition A” may be based on both a condition A and a condition B without departing from the scope of the present disclosure. In other words, as used herein, the phrase “based on” shall be construed in the same manner as the phrase “based at least in part on.” Further, as used herein, including in the claims, a “set” may include one or more elements.

Some implementations of the method and apparatuses described herein may store a ML model and a set of ML parameters associated with the ML model; generate a first set of forward-pass values based on a first perturbation of the set of ML parameters by a random vector in a positive direction; generate a second set of forward-pass values based on a second perturbation of the set of ML parameters by the random vector in a negative direction; transmit a set of training messages to a corresponding set of UEs, where each training message comprises the first set of forward-pass values and the second set of forward-pass values; receive a set of loss difference values, where each loss difference value is associated with a UE of the set of UEs; determining a model update decision based on the set of loss difference values; and transmitting, to the set of UEs, an update message indicating the model update decision.

Some implementations of the method and apparatuses described herein may store a ML model and a set of ML parameters associated with the ML model; receive, from a base station, a training message comprising a first set of forward-pass values and a second set of forward-pass values, where the first set of forward-pass values corresponds to a first perturbation of the set of ML parameters in a positive direction and the second set of forward-pass values corresponds to a second perturbation of the set of ML parameters in a negative direction; determine a loss difference value based on a random vector and the training message; transmit, to the base station, a feedback message comprising the loss difference value; and receive, from the base station, an update message indicating a model update decision.

DETAILED DESCRIPTION

A wireless communications system may use ML models to improve communication performance. For example, the radio nodes (e.g., UEs, NEs, etc.) may improve performance by replacing traditional modules with ML-based modules at the transmitter and/or receiver. Furthermore, joint training for the transmitter and receiver, known as end-to-end learning, may be a feature of future wireless communication systems.

To date, end-to-end learning has primarily focused on point-to-point communication systems, i.e., systems with a single transmitter and a single receiver. However, real-world deployments of wireless communication systems typically comprise multi-user systems designed to serve multiple users simultaneously, e.g., point-to-multipoint or multipoint-to-point communication systems.

One challenge of implementing end-to-end learning in a multi-user system is the communication overhead required for jointly updating the ML models of the various users. For example, conventional techniques for jointly updating the ML models require back-propagation, which can incur high feedback overhead especially as the number of users increases.

Accordingly, aspects of the present disclosure include techniques for enabling a NE and multiple UEs to efficiently implement end-to-end ML in multi-user systems. In some implementations, for example, the radios nodes in the multi-user system, e.g., a base station (BS) and one or more UEs, may utilize zeroth order (ZO) stochastic gradient descent (SGD) for updating the ML model to benefit from reducing communication, computations, and memory requirements.

In some implementations, for example, the radio nodes (e.g., the BS and UEs) agrees upon a system consensus on loss to prevent the loss cancellation in multi-user end-to-end learning. In some implementations, for example, the BS may incorporate existing UE feedback measurements, such as channel quality, into the multi-user end-to-end learning framework by adjusting the loss weights for service priority.

In some implementations, for example, each UE uses the self-generating/testing method that evaluates multiple random vectors and finds the best random vector locally without additional communication overhead. In some implementations, for example, the radio nodes (e.g., the BS and the UEs) reduce the memory overhead required for updating the ML models with ZO SGD at the BS and UEs by using their own randoms seeds. The function of a random seed is to re-generate the previously used random vectors once they are needed without having to store the entire vector. This is especially beneficial for reduced capacity (RedCap) UEs as the random vectors size may correspond to the number of ML parameters, for example, having tens of thousands of values.

Aspects of the present disclosure are described in the context of a wireless communications system.

Figure 1:
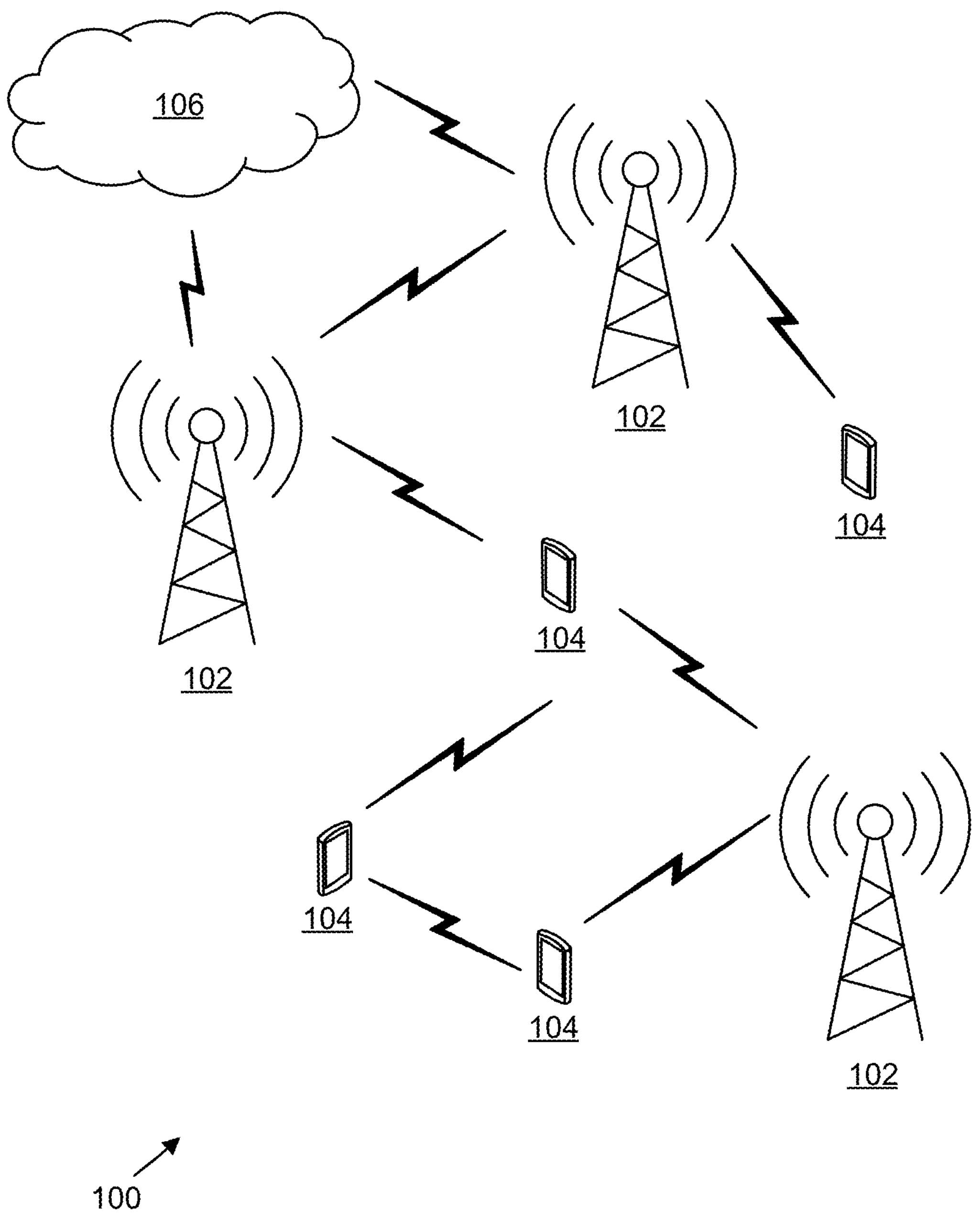
FIG. 1 illustrates an example of a wireless communications system in accordance with aspects of the present disclosure.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as a Long-Term Evolution (LTE) network or an LTE-Advanced (LTE-A) network. In some other implementations, the wireless communications system 100 may be a New Radio (NR) network, such as a 5G network, a 5G-Advanced (5G-A) network, or a 5G ultra-wideband (5G-UWB) network.

In other implementations, the wireless communications system 100 may be a combination of a 4G network and a 5G network, or other suitable radio access technology (RAT) including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an internet-of-things (IoT) device, an internet-of-everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N3, or network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management function (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signaling bearers, etc.) for the one or more UEs 104 served by the one or more NE 102 associated with the CN 106.

The CN 106 may communicate with a packet data network over one or more backhaul links (e.g., via an S1, N2, N3, or another network interface). The packet data network may include an application server. In some implementations, one or more UEs 104 may communicate with the application server. A UE 104 may establish a session (e.g., a protocol data unit (PDU) session, or a PDN connection, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally, or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively.

Each slot may include a number (e.g., quantity) of symbols (e.g., orthogonal frequency domain multiplexing (OFDM) symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

Thus far, end-to-end learning has primarily focused on point-to-point communication systems, i.e., systems with a single transmitter and a single receiver. There has been limited research on applying end-to-end learning to point-to-multipoint or multipoint-to-point communication systems, despite the fact that most current communication systems are designed to serve multiple users simultaneously.

Figure 2:
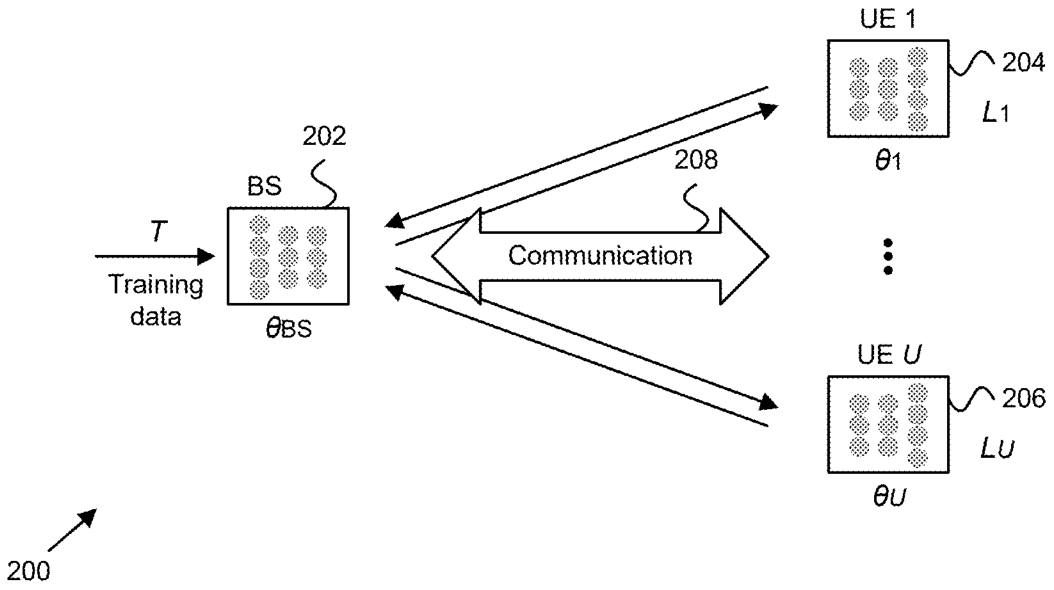
FIG. 2 illustrates an example of a multi-user system that supports end-to-end learning, in accordance with aspects of the present disclosure.

FIG. 2 depicts an exemplary multi-user system 200 that supports end-to-end learning, in accordance with aspects of the present disclosure. The multi-user system 200 comprises a single BS 202 and U number of UEs, including at least a first UE 204 (denoted "UE 1") and a Uth UE 206 (denoted "UE U"). The multi-user system 200 illustrates an end-to-end learning framework for the multi-user system, where the BS 202 has an ML model characterized by the set of trainable parameters $\theta_{BS}$, while the UE u has an ML model characterized by the set of trainable parameters $\theta_u$, $u=1, \ldots, U$.

As used herein, the terms "ML model" and "ML parameters" refer to different aspects of the ML process. The ML model is a mathematical representation, e.g., of a real-world process, that is designed to make predictions and/or decisions based on input data. The ML model defines the structure (e.g., framework) and the form of the function that will be used to map inputs to outputs. ML models are created by training algorithms on a dataset, which allows the model to learn patterns and relationships within the data.

In contrast, the ML parameters are the internal coefficients (e.g., weights and biases) within a ML model that are learned from the training data. The specific values of the ML parameters determine how the input data is mathematically transformed into the output (e.g., predictions). As such, the ML parameters define the specific configuration of the ML model. In various embodiments, the ML parameters may be optimized (e.g., updated) to minimize the error in predictions. Note that the ML parameters (i.e., detailing how inputs are transformed into outputs) are distinct from the settings used to control the training process and the structure of the model itself. Such settings may be referred to as to hyper-parameters differentiate from the ML parameters.

There are various objectives for multi-user systems, such as data recovery, channel estimation, and synchronization. For example, in data recovery, the primary goal is for the BS 202 to successfully transmit its message to the UEs 204, 206 over the wireless communication channel. To achieve this, the BS 202 encodes its message into a transmit signal by using its ML model.

This signal is then transmitted over the communication channel and each UE 204, 206 that receives the transmitted signal may then decode the signal into a message by using its own ML model. The performance of data recovery at the UEs 204, 206 depends on how well the ML models of the BS 202 and the UEs 204, 206 have been trained.

In general, for end-to-end learning in the multi-user system, i.e., for multi-user end-to-end learning, the BS 202 and the UEs 204, 206 jointly train their ML models (specifically, update their ML model parameters) through multiple rounds of communication 208 over the wireless channel. With well-trained ML models at both the BS 202 and the UEs 204, 206, the system can achieve high wireless performance, such as improved data rates. Therefore, for end-to-end learning in the multi-user system, the BS 202 and the UEs 204, 206 should regularly communicate with each other to jointly update their ML model parameters.

Define the set of entire ML model parameters θ of the multi-user system as:

$$\theta = \begin{bmatrix} \theta_{BS} \\ \theta_1 \\ \vdots \\ \theta_U \end{bmatrix}.$$

The main objective of multi-user end-to-end learning is to train all these ML model parameters in a joint manner. For preparation to conduct training, the set of training data T is to be shared at the BS and UEs. The training data is described in greater detail below.

To evaluate the effectiveness of the training, an objective performance metric may be defined that captures the overall performance across all BS and UEs. First, a loss value for UE u is defined as $L_u(\theta_{BS}, \theta_u; T)$. For example, in data recovery, the BS encodes the messages of the training data T using its ML model with $\theta_{BS}$, and UE u decodes the received signal to recover the messages by using its ML model with $\theta_u$. The training data is described in greater detail below.

The loss value, denoted by $L_u(\theta_{BS}, \theta_u; T)$, in the example of data recovery, should capture the performance error when the UE u incorrectly recovers the transmitted message. In general, there may be various ways to define the total loss of the multi-user system, such as the sum of the loss values of all the UEs, the weighted sum of the loss values of the UEs, or the maximum of the loss values of all the UEs.

Because the weighted sum framework provides more flexibility, i.e., by allowing the adjustment of the weight values (e.g., based on service priority and/or channel quality), in some embodiments the BS may determine the total loss using the weighted sum of the loss values across all UEs. In such embodiments, the weight on the loss of UE u may be denoted as $w_u$. Consequently, the total loss may be represented as:

$$L(\theta; T) = \sum_{u=1}^{U} w_u L_u(\theta_{BS}, \theta_U; T).$$

An objective of end-to-end learning in the multi-user system is to train the ML model parameters θ that minimize the total loss L(θ; T). By optimizing this metric, the multi-user system ensures that the ML models at the BS and UEs are effectively trained, leading to improved overall system performance.

Training all ML model parameters θ in the multi-user system requires continuous communication between the BS and UEs. Consider a typical wireless communication system, where the BS communicates with the UEs while there is no communication among the UEs (referred to as device-to-device (D2D) communications). In certain embodiments, the multi-user end-to-end learning framework may be extended to including D2D communications, but the following descriptions do not consider the D2D communication for ease of discussions. Rather, the exemplary multi-user end-to-end learning framework considers two directions of communication: (a) from the BS to the UEs (i.e., downlink (DL) communication) and (b) from the UEs to the BS (i.e., uplink (UL) communication).

In typical wireless communication systems, UL communication is more costly since the UEs have lower power and computing capabilities as compared to the BS. Therefore, it is crucial to minimize the UL, or feedback, overhead required for training the ML models. Note that the feedback overhead is significantly impacted by (i) increasing size of the ML models expected to be employed at the UEs, and (ii) the number of UEs in the system.

Regarding the increasing size of ML models, recent trends indicate the use of large-size models to learn large dimensional latent features, e.g., as seen in the success of large language models with tens of billions of ML model parameters. While the ML models for data recovery, channel estimation, and synchronization may not comprise billions of ML model parameters, it is expected that these ML models may have thousands or tens of thousands of ML model parameters, and perhaps more.

Regarding scaling challenges from supporting a large number of UE in the wireless communication system, it is expected that 6G wireless networks (and the future networks) will need to serve many, if not massive, number of UEs simultaneously, as the number of devices in communication networks continues to grow. For example, a 6G wireless network (or other future network) may be expected to support hundreds of UEs simultaneously. In other embodiments, a 6G wireless network (or other future network) may be expected to support a larger number or smaller number of UEs simultaneously, depending on deployment objectives. Note that the UEs simultaneously served by a 6G wireless network (or other future network) may include both UEs that support AI techniques and UEs that have non-AI modules and thus do not support AI techniques.

Accordingly, the following solutions describe various techniques for communication-efficient end-to-end learning method for multi-user systems, particularly by reducing the feedback overhead.

A common approach to update the ML model parameters θ is to use conventional stochastic gradient descent (SGD). In conventional SGD, the ML model parameters are updated by subtracting its gradients $\nabla_\theta L(\theta; T)$, scaled by the learning rate η, as:

$$\theta \leftarrow \theta - \eta \nabla_\theta L(\theta; T).$$

Conventional SGD calculates the gradients $\nabla_\theta L(\theta; T)$ directly, which requires (i) one forward pass to calculate the loss value (referred to as forward-propagation) and (ii) one backward pass to calculate the gradients (referred to as back-propagation). However, back-propagation requires more computation and memory than forward-propagation.

To mitigate the computation and memory required for back-propagation, zeroth-order (ZO) SGD may be used for training without back-propagation. ZO SGD shows significant benefits when employing large ML models, such as in large language models. ZO SGD approximates the gradient as $\hat{\nabla}_\theta L(\theta; T)$ and updates the ML model parameters as:

$$\theta \leftarrow \theta - \eta \hat{\nabla}_\theta L(\theta; T).$$

ZO SGD obtains the approximate gradient $\hat{\nabla}_\theta L(\theta; T)$ through only two forward passes. Specifically, a random perturbation vector z is first generated, having the same size as that of θ. The approximate gradient $\hat{\nabla}_\theta L(\theta; T)$ is then obtained by estimating the slope by using the two loss values, $L(\theta+\epsilon z; T)$ in the positive direction of z and $L(\theta-\epsilon z; T)$ in the negative direction of z, where ϵ denotes the perturbation step size. Formally, the approximate gradient $\hat{\nabla}_\theta L(\theta; T)$ is obtained by:

$$\hat{\nabla}_\theta L(\theta; T) = z\frac{L(\theta+\epsilon z; T) - L(\theta-\epsilon z; T)}{2\epsilon}.$$

The use of ZO SGD has mostly been discussed in the context of a one-sided ML model (meaning that all ML model parameters θ are in a single entity), from the perspective of reducing computations and memory within that entity.

The high feedback overhead is the main challenge for end-to-end learning when training two-sided or multi-sided ML models, which has been recently pointed out in literature and wireless standards. Conventional SGD requires back-propagation to calculate the gradients across the BS and UEs. This implies that, for back-propagation, the UEs should transmit back the gradient values to the BS, which might incur high feedback overhead. This feedback overhead is significantly increased by the large number of UEs in the network and the large size of UEs' ML models.

While ZO SGD has been employed for a one-sided ML model to benefit from reducing computations and memory requirements, it has not been discussed from the perspective of communication benefits in two-sided or multi-sided ML models that require communication for training.

Federated learning is a distributed machine learning approach where multiple devices collaboratively train a shared model under the orchestration of a central server, while keeping their training data localized. The underlying system setup is that all devices and the central server work together to train a common and single ML model through communication between the central server and the devices.

Although federated learning and multi-user end-to-end learning both fall under the umbrella of distributed machine learning, their system setups and objectives differ significantly. First, regarding the system setup, in federated learning, all entities (the BS and UEs) aim to train a single common ML model, whereas, in multi-user end-to-end learning, each entity has a distinct ML model.

Second, regarding the objective of the system, federated learning focuses on training a single ML model by leveraging diverse data from multiple devices while maintaining data privacy, while multi-user end-to-end learning aims to train multiple ML models in a coordinated manner to maximize wireless communication performance. In this disclosure, we discuss multi-user end-to-end learning.

The present disclosure describes a framework that incorporates ZO SGD into multi-user end-to-end learning and further describes a protocol for DL/UL communication between the BS and UEs to update their ML model parameters. The solutions described herein use ZO SGD for multi-user end-to-end learning to benefit from reduced feedback overhead, since ZO SGD does not rely on back-propagation for ML model updates. In the following descriptions, a novel update formula is described for the multi-user end-to-end learning, and novel strategies are described for optimizations at the BS and UEs. In certain aspects, random seeds may be used to enhance the efficiency in computation and memory for multi-user end-to-end learning, as described in further detail below.

Regarding the updating of the ML parameters, recall that the ML parameter updates with ZO SGD are conducted according to the expression:

$$\begin{bmatrix} \theta_{BS} \\ \theta_1 \\ \vdots \\ \theta_U \end{bmatrix} \leftarrow \begin{bmatrix} \theta_{BS} \\ \theta_1 \\ \vdots \\ \theta_U \end{bmatrix} - \eta \hat{\nabla}_\theta L(\theta; T).$$

To calculate the approximate gradient $\hat{\nabla}_\theta L(\theta; T)$, the BS and the U UEs each generate a random vector, e.g., generated independently. In the following, the random vector generated by the BS is denoted as $z_{BS}$ and the respective random vector generated by the UE u is denotes as $z_u$. Moreover, the entire random vector may be denoted as:

$$z = \begin{bmatrix} z_{BS} \\ z_1 \\ \vdots \\ z_U \end{bmatrix}.$$

With the generated vectors, two forward passes are conducted to calculate $L(\theta+\epsilon z; T)$ and $L(\theta-\epsilon z; T)$. As discussed above, the total loss L may be a weighted sum of the individual loss values of the U UEs. Thus, the loss values of the two forward passes may be expressed as:

$$L(\theta+\epsilon z;T)=\sum_{u=1}^{U}w_uL_u(\theta_{BS}+\epsilon z_{BS},\theta_u+\epsilon z_u;T)=\sum_{u=1}^{U}w_uL_u^+$$

and $$L(\theta-\epsilon z;T)=\sum_{u=1}^{U}w_uL_u(\theta_{BS}-\epsilon z_{BS},\theta_u-\epsilon z_u;T)=\sum_{u=1}^{U}w_uL_u^-$$

where two variables, $$L_u^+=L(\theta_{BS}+\epsilon z_{BS},\theta_u+\epsilon z_u;T)$$

and $$L_u^-=L(\theta_{BS}-\epsilon z_{BS},\theta_u-\epsilon z_u;T)$$

are introduced for notational simplicity. Then, the approximate gradient $\hat{\nabla}_\theta L(\theta;T)$ is calculated as:

$$\hat{\nabla}_\theta L(\theta;T)=z\frac{L(\theta+\epsilon z;T)-L(\theta-\epsilon z;T)}{2\epsilon}=\begin{bmatrix}z_{BS}\\z_1\\\vdots\\z_U\end{bmatrix}\frac{\sum_{u=1}^{U}w_u(L_u^+-L_u^-)}{2\epsilon}.$$

With the calculated gradient above, the ML parameter update formula is represented as:

$$\begin{bmatrix}\theta_{BS}\\\theta_1\\\vdots\\\theta_U\end{bmatrix}\leftarrow\begin{bmatrix}\theta_{BS}\\\theta_1\\\vdots\\\theta_U\end{bmatrix}-\eta\begin{bmatrix}z_{BS}\\z_1\\\vdots\\z_U\end{bmatrix}\frac{\sum_{u=1}^{U}w_u(L_u^+-L_u^-)}{2\epsilon}.$$

From the above equation, it can be observed that each entity (i.e., the BS and the UEs) updates its ML model parameters based on the direction of the randomly generated vector, scaled by a weighted sum of loss difference values. Although the ML parameter updates are in a simple form as given above, proper strategies and protocol on how to conduct the update procedure in the multi-user system with separated ML models have not been clearly discussed. Therefore, the following solutions describe aspects of a communication protocol for multi-user end-to-end learning. The following solutions also describe various strategies at the BS and UEs within this protocol.

Figure 3:
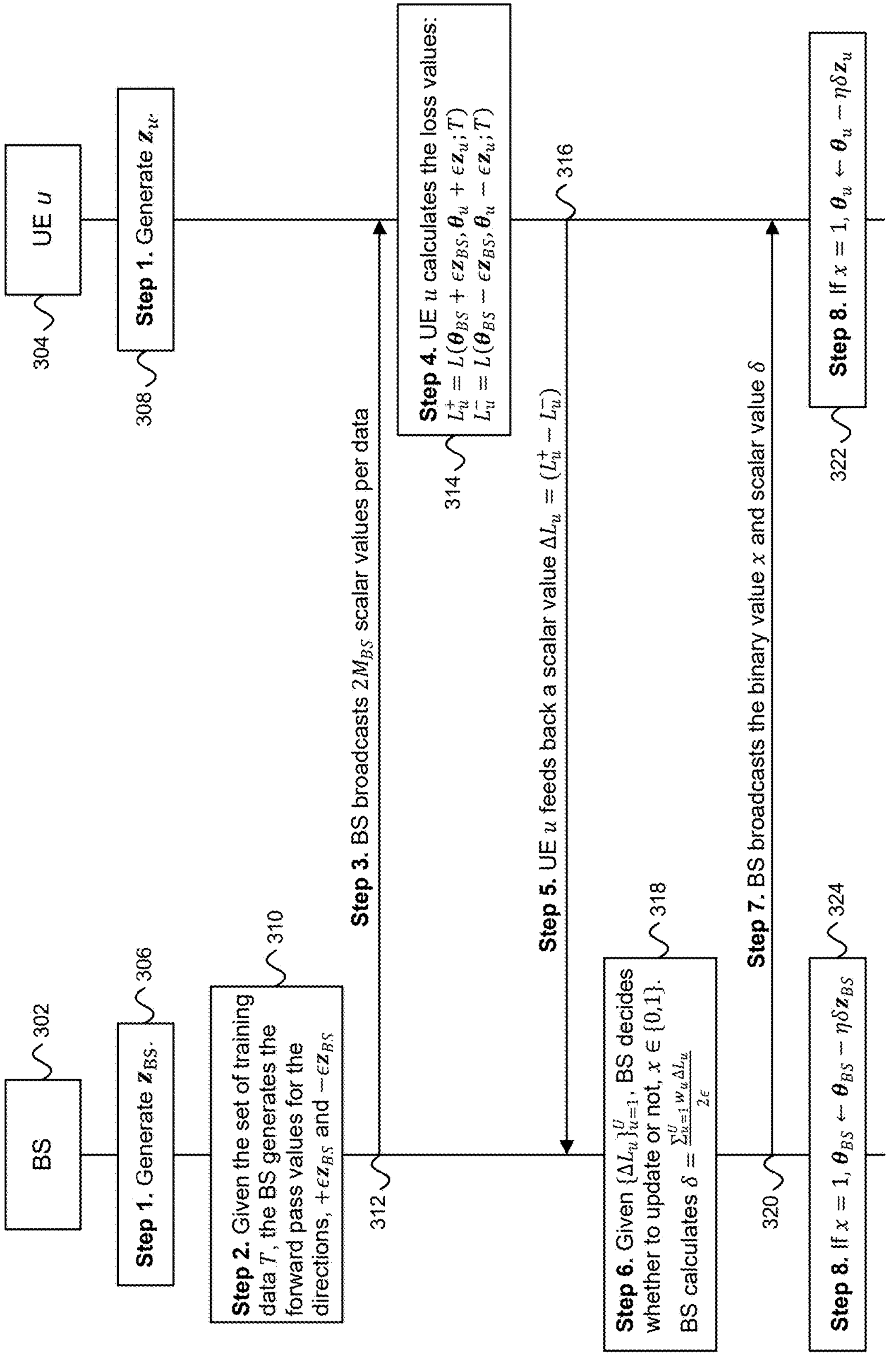
FIG. 3 illustrates an example of a communication procedure for end-to-end learning in multi-user systems, in accordance with aspects of the present disclosure.

FIG. 3 depicts a communication protocol 300 for the ZO SGD-based end-to-end learning in multi-user systems. The communication protocol 300 depicts the overall timeline of the communication between a BS 302 and a representative UE u 304 as these entities update their ML model parameters using ZO SGD for multi-user end-to-end learning. For ease of discussion, FIG. 3 only shows communication between the BS 302 and a single UE u 304; however, it will be understood by one of ordinary skill that in the multi-user system the BS communicates with all U UEs, e.g., by broadcasting the common values to the UEs and receiving the feedback values individually from the U UEs. A description of the communication protocol 300 is as follows:

At Step 1, the BS 302 generates its random vector $z_{BS}$ (see block 306) and the UE u 304 generates its random vector $z_u$ (see block 308). In the multi-user system, each UE would generate its random vector, i.e., for u=1, . . . , U.

At Step 2, by using each i-th input data $$\{x_{u,i}\}_{u=1}^{U},$$

the BS 302 generates a total of $2M_{BS}$ scalar values for the two forward passes (see block 310), where $M_{BS}$ is the number of outputs in the last layer of the BS 302's ML model. One set of $M_{BS}$ values corresponds to the BS 302's ML model outputs corresponding to the ML model parameters $\theta_{BS}+\epsilon z_{BS}$ perturbed in the positive direction of $z_{BS}$, while another set of $M_{BS}$ values corresponds to the BS 302's ML model outputs corresponding to the ML model parameters $\theta_{BS}-\epsilon z_{BS}$ perturbed in the negative direction of $z_{BS}$. In total, the BS 302 generates $2M_{BS}N_T$ scalar values for all $N_T$ input data.

At Step 3, the BS 302 broadcasts $2M_{BS}N_T$ scalar values (see signaling 312).

At Step 4, the UE u 304 continues to calculate the loss values corresponding to the positive and negative directions of its random vector $z_u$ by using its output/target data $$\{y_{u,i}\}_{i=1}^{N^T},$$

i.e., $$L_u^+=L(\theta_{BS}+\epsilon z_{BS},\theta_u+\epsilon z_u;T)$$

and $$L_u^-=L(\theta_{BS}-\epsilon z_{BS},\theta_u-\epsilon z_u;T)$$

(see block 314). Note that in the multi-user system, each UE would calculate its loss values corresponding to the positive and negative directions.

At Step 5, the UE u 304 feeds back a scalar value $$\Delta L_u=(L_u^+-L_u^-)$$

to the BS 302 (see signaling 316). Note that in the multi-user system, each UE (i.e., for u=1, . . . , U) would feed back a scalar value corresponding to the difference between its loss values the positive and negative directions.

At Step 6, the BS 302 receives the scalar value(s) $\Delta L_u$ (e.g., from all UEs, u=1, . . . , U). Given $$\{\Delta L_u\}_{u=1}^{U},$$

the BS 302 determines a binary variable x∈{0,1}, denoting whether to update or not (see block 318). In one embodiment, the value x=1 indicates that the BS and UEs update their ML model parameters. Additionally, the BS 302 calculate a scalar value $$\delta = \frac{\sum_{u=1}^{U} w_u \Delta L_u}{2\epsilon}$$

denoting the scaling factor for learning (see block 318).

At Step 7, the BS 302 broadcasts the binary variable x and the scalar value δ, e.g., to the U UEs (see signaling 320). It is assumed that the values of the perturbation step size ϵ and the learning rate η are shared at the BS 302 and the UE u 304.

At Step 8, the UE u 304 receives x and δ. If x=1, the UE u 304 updates its ML model parameters as $\theta_u \leftarrow \theta_u - \eta\delta z_u$ (see block 322). Note that in the multi-user system, each UE (i.e., for u=1, . . . , U) would updates its ML model parameters. At the same time, the BS 302 updates its ML model parameters as $\theta_{BS} \leftarrow \theta_{BS} - \eta\delta z_{BS}$ if x=1 (see block 324). However, if x=0, the BS and UEs do not update their ML model parameters.

Note that Steps 1-8 represent a single learning iteration. In various embodiments, the BS 302 and UE u 304 repeat Steps 1-8 until the system terminates the ML model update procedure (e.g., due to the BS 302 determining not to update in Step 6). The communication protocol 300 thus ends.

Regarding the training data, a set of training data corresponding to UE u may be defined as $T_u$, u=1, . . . , U. The set Ty consists of the $N_T$ training pairs, given by $$T_u = \{(x_{u,i}, y_{u,i})\}_{i=1}^{N_T},$$

where $x_{u,i}$ denotes the i-th input data and $y_{u,i}$ denotes the i-th output or target data. For end-to-end learning between the BS and UE u, the BS is assumed to have the $N_T$ input data, $$\{x_{u,i}\}_{i=1}^{N_T}$$

while UE u is assumed to have the $N_T$ output data $$\{y_{u,i}\}_{i=1}^{N_T}.$$

For multi-user end-to-end learning, the BS has the $UN_T$ input data for all U UEs, $$\{x_{u,i}\}_{i=1,u=1}^{N_T,U}.$$

It is assumed that the training data is available at the BS and UEs before the protocol begins.

The overall process of multi-user end-to-end learning can be understood by examining the encoding/decoding process of each training data. The i-th input data, $$\{x_{u,i}\}_{u=1}^{U},$$

is the input to the BS's ML model, while the i-th output data corresponding to UE u, $y_{u,i}$, is the target output value of the UE u's ML model. Specifically, from the BS side, the BS encodes the i-th input data $$\{x_{u,i}\}_{u=1}^{U}$$

into the form of transmit signals through its ML model, where each $x_{u,i}$ is intended for UE u, and sends the transmit signals to all UEs.

From the UE side, each UE u calculates the per-data loss value that measures the difference between the output/target data $y_{u,i}$ and the inference output that is obtained when the input data $$\{x_{u,i}\}_{u=1}^{U}$$

goes through the BS's ML model, the wireless channel, and the UE u's model. Note that the loss value at UE u is calculated to capture all the per-data loss values, e.g., the average of per-data loss values over the $N_T$ training data.

The specific values of the input/output data depend on what problems the communication system aims to solve. For example, for data detection, the input of the BS's ML model $x_{u,i}$ should denote the message symbol or the chunk of bits, while the output of the UE's ML model $y_{u,i}$ should also be the message symbol or the chunk of bits. In this case, the input data and output data are the same, i.e., $x_{u,i}=y_{u,i}$. For channel estimation as another example, the input of the BS's ML model should denote the symbol/pilot message, while the output of the UE's ML model should denote the channel values. In this case, the input data and output data differ from each other, i.e., $x_{u,i} \neq y_{u,i}$.

We describe the detailed protocol that explains how the BS and UEs use the training data to update their ML model parameters using ZO SGD through communication between them.

Table 1 shows the specific DL/UL overhead required to update the ML model parameters in end-to-end learning with ZO SGD and conventional SGD in the U-user system. As shown in Table 1, ZO SGD significantly reduces the UL overhead at the expense of increasing DL overhead, compared to conventional SGD.

TABLE 1

| | ZO SGD | Conventional SGD |
|---|---|---|
| Downlink | $2M_{BS}N_T + 1$ scalars/ 1 binary | $M_{BS}N_T$ scalars |
| Uplink | U scalars | $N_T\sum_{u=1}^{U} M_u$ scalars |

Regarding the DL/UL communication overhead when using ZO SGD, in the ZO SGD-based protocol described with reference to FIG. 3, there are two types of communication overhead: (i) DL overhead (e.g., for broadcasting in Steps 3 and 7) and (ii) UL overhead (e.g., for feedback in Step 5). The DL overhead is the transmission of $2M_{BS}N_T+1$ scalars and one binary, while the UL overhead is the U scalars transmission.

Regarding the DL/UL communication overhead when using conventional SGD, in the DL direction, only one forward pass is required to calculate the loss value per data, which leads that the BS broadcasts $M_{BS}N_T$ scalars to the UEs. However, regarding the UL overhead, each UE back-propagates the gradients, and the first layer's values should be transmitted back to the BS to continue the back-propagation. Denoting the number of inputs of the first layer in the UE u's ML model as $M_u$, a respective UE u transmits $M_u$ values to the BS per training data. Thus, the total UL overhead across U UEs with all $N_T$ training data is then the transmission of $$N_T \sum_{u=1}^{U} M_u \text{ scalars.}$$

Comparing the communication overhead of the end-to-end learning schemes, the ZO SGD learning scheme requires about two times more DL overhead than conventional SGD learning scheme. However, regarding the UL overhead, the ZO SGD learning scheme significantly reduces the UL overhead as compared to the conventional SGD learning scheme. Specifically, the ZO SGD learning scheme requires only a scalar value to be transmitted from each UE to the BS. In contrast, the conventional SGD learning scheme requires high UL overhead, which increases with the number of training data ($N_T$), the number of UEs (U) in the system, and the size of UE's ML models (specifically, the number of first layer's input of the ML models, $M_u$).

In summary, ZO SGD-based end-to-end learning significantly reduces the UL overhead at the expense of increasing DL overhead, compared to conventional SGD. Downlink is more supported than UL in typical wireless systems because the BS has in general greater computing capabilities and is allowed to use higher transmit power. Therefore, DL overhead can be more acceptable than UL overhead for end-to-end learning, and thus ZO SGD is a communication-efficient method for end-to-end learning in wireless communications.

In addition, ZO SGD-based end-to-end learning will be more beneficial when high UL transmission is required, such as in large-scale networks with many UEs and in systems with large ML models at the devices. In addition to the benefits in communication overhead, the ZO SGD learning scheme is also beneficial in reducing computations as compared to conventional SGD, since ZO SGD does not require back-propagation for ML model updates. This computational benefit is more apparent in wireless communication systems with RedCap devices.

In the ZO SGD-based protocol described with reference to FIG. 3, the BS may use one of the following strategies (i) to decide whether to update the ML models or not (i.e., determining the binary variable x) and (ii) to determine the UEs' loss weights, $$\{w_u\}_{u=1}^{U}.$$

After receiving the loss difference values from all the UEs, i.e., $$\{\Delta L_u\}_{u=1}^{U}$$

(e.g., in Step 6 of the ZO SGD-based protocol described with reference to FIG. 3), the BS should decide whether to update the ML model parameters or not. If $$\delta = \frac{\sum_{u=1}^{U} w_u \Delta L_u}{2\epsilon} \approx 0,$$

the gradient step size is almost zero, meaning that the ML model parameters would not be significantly updated. In this case, the BS decides not to update, e.g., by setting x=0, to save computational resources.

Note that the almost-zero gradient step size may occur in multi-user end-to-end learning when the loss difference values are cancelled out (or, equivalently, if they add up destructively) across different UEs. Such cancellation would degrade the learning performance in multi-user systems. To avoid this cancellation, the wireless communication system may support the concept of system consensus on the loss-difference direction.

The basic idea of system consensus on the loss-difference direction is that it would be ideal if $\Delta L_u$ has the same sign for each UE u, i.e., either $\Delta L_u>0$ for all u or $\Delta L_u<0$ for all u. To achieve this common goal, the system (i.e., comprising the BS and U UEs) should agree upon a system consensus on what direction of $\Delta L_u$ they all will try to achieve. The specific strategy on achieving $\Delta L_u$ based on the system consensus is performed at the UEs, as discussed in greater detail below.

Regarding the UEs' loss weights, the BS may adaptively adjust the weights $$(\{w_u\}_{u=1}^{U}),$$

e.g., based on the service priority by using the UE feedback information, such as channel quality, low-latency requirement, etc. For example, if the channel quality of a specific UE is poor, the BS may increase the weight of that UE to assign a higher priority in minimizing its loss and improving the fairness of the wireless link performance over the UEs. Similarly, if a specific UE requires low latency, the BS can increase the weight to prioritize that UE.

Recall that to determine the loss difference values at the respective UE u (e.g., in Step 4 of the ZO SGD-based protocol described with reference to FIG. 3), the UE u (i) receives the forward-pass values regarding the perturbed ML model parameters, $\theta_{BS}+\epsilon z_{BS}$ and $\theta_{BS}-\epsilon z_{BS}$, from the BS, (ii) continues to calculate the loss values based on its perturbed ML model parameters $\theta_u+\epsilon z_u$ and $\theta_u-\epsilon z_u$, and (iii) finally obtains the loss values, $$L_u^+ = L(\theta_{BS} + \epsilon z_{BS}, \theta_u + \epsilon z_u; T)$$

and $$L_u^- = L(\theta_{BS} - \epsilon z_{BS}, \theta_u - \epsilon z_u; T)$$

and thus the loss difference value $$\Delta L_u - L_u^+ - L_u^-$$

Note that the loss difference value is available at UE u (not at the BS) and each UE feeds back its loss difference value to the BS. In summary, from the UE side, each UE u locally generates its own random vector $z_u$ and calculates the loss values (and loss difference value) based on that vector.

As an extension, each UE may try multiple random vectors to further optimize performance. Motivated by this, in some embodiment the UEs may support a self-generating/testing technique, whereby each UE may autonomously identify the best random vector by generating and testing multiple random vectors. Note that this technique does not incur any communication overhead, as it is performed locally at each UE after receiving the forward-pass values from the BS.

Consider how each UE u can find a good random vector under the system consensus. First suppose that the system agrees upon achieving $\Delta L_u > 0$, u=1, . . . , U. To achieve this, each UE u conducts the self-generating/testing method, i.e., generates different random vector $z_u$, calculates the loss difference values $\Delta L_u$ based on them, and selects the best one that maximizes $\Delta L_u$, i.e., $$z_u^\star = \text{argmax}_{\{z_u\}} \Delta L_u$$

As more random vectors are tried, the UE would find a better random vector.

The number of trials can depend on each UE's computing capability. If a UE has more computational resources, it can perform more trials to find a better random vector. In contrast, the UEs with limited computational resources may perform fewer trials. By maximizing the loss difference value at each UE as an agreement made in the system, it is more likely to prevent the scenario where the loss difference values are cancelled out, i.e., $$\sum_{u=1}^{U} w_u \Delta L_u \approx 0.$$

Alternatively, if the system agrees upon achieving $\Delta L_u < 0$, u=1, . . . , U, then each UE u may conduct the self-generating/testing method, calculate the loss difference values $\Delta L_u$ based on them, and then select the one that minimizes $$\Delta L_u, \text{ i.e., } z_u^* = \text{argmin}_{\{z_u\}} \Delta L_u$$

In this situation, by minimizing the loss difference value at each UE, the system is more likely to avoid the scenario where the loss difference values are cancelled out, i.e., $$\sum_{u=1}^{U} w_u \Delta L_u \approx 0.$$

The above discussed shows the benefits of using ZO SGD in reducing communication/computation overhead. Additionally, in further embodiments the wireless communication system may reduce the memory overhead required in ZO SGD-based ML model updates by using random seeds to generate the random vectors $z_{BS}$, $z_u$. Accordingly, using random seeds in multi-user end-to-end learning can achieve benefits in reducing memory overhead.

Recall that, for learning with ZO-SGD, each of the BS and UEs generates its own random vector and uses it to perform the two forward passes for positive/negative directions and to update the ML model parameters when an update is decided. To this end, they must save the random vectors in their memory to calculate the two forward passes and update the ML model parameters. However, if the model size is large, storing the random vector (which is the same size as the ML model) may take up a significant amount of memory at the devices, particularly at the UEs which have fewer memory resources as compared to the BS. Also, in wireless systems with RedCap devices, saving the random vector may be challenging due to the limited memory constraints. Therefore, by using a random seed, the BS and UEs may re-generate the previously used random vectors once they are needed (e.g., on-demand) without having to store the random vectors in memory. In this way, the BS and UEs can reduce memory overhead required in updating their ML models by using their own random seeds.

Figure 4:
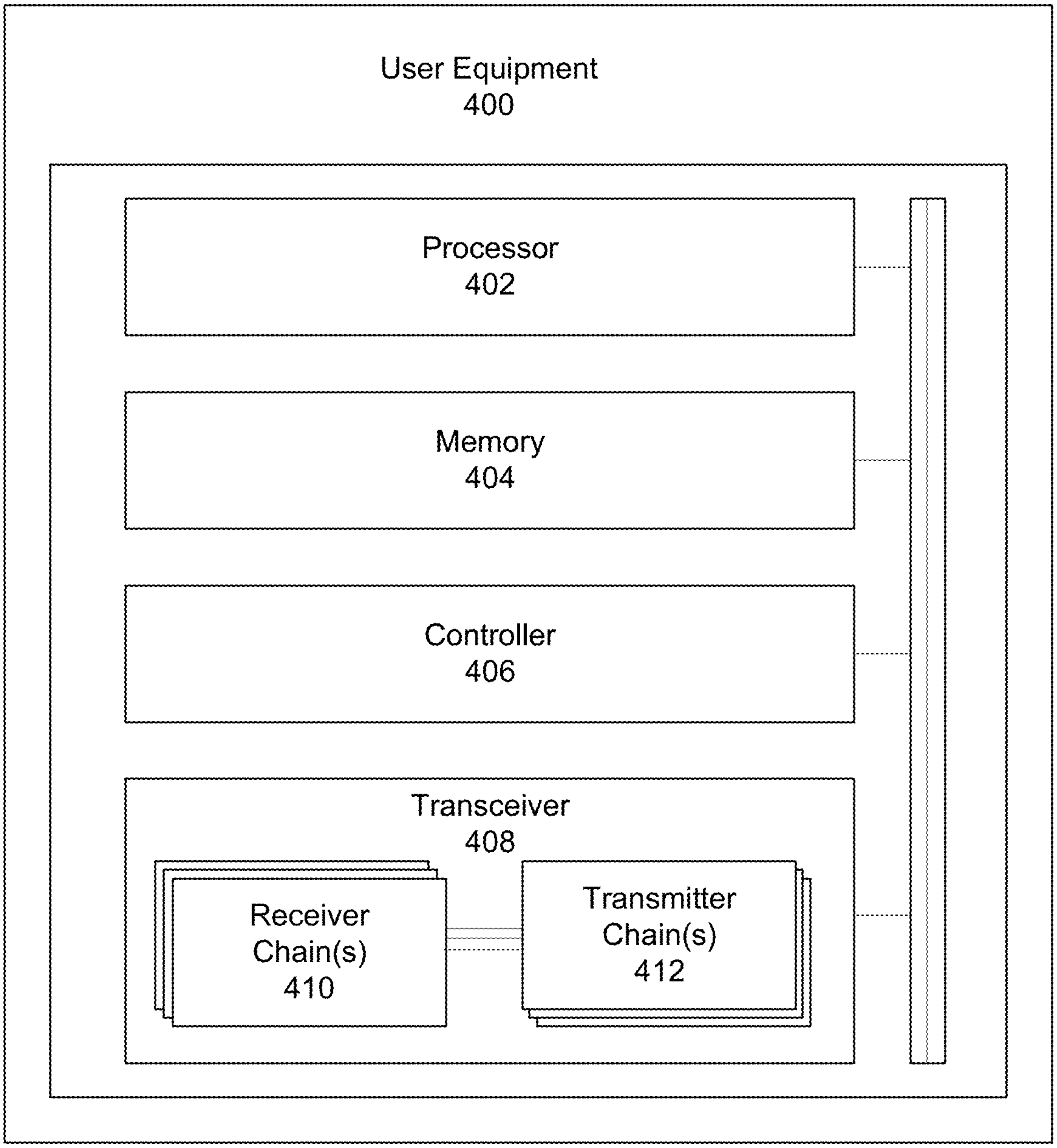
FIG. 4 illustrates an example of a UE in accordance with aspects of the present disclosure.

FIG. 4 illustrates an example of a UE 400 in accordance with aspects of the present disclosure. The UE 400 may include a processor 402, a memory 404, a controller 406, and a transceiver 408. The processor 402, the memory 404, the controller 406, or the transceiver 408, or various combinations thereof or various components thereof may be examples of means for performing various aspects of the present disclosure as described herein. These components may be coupled (e.g., operatively, communicatively, functionally, electronically, electrically) via one or more interfaces.

The processor 402, the memory 404, the controller 406, or the transceiver 408, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 402 may include an intelligent hardware device (e.g., a general-purpose processor, a DSP, a central processing unit (CPU), an ASIC, a field programmable gate array (FPGA), or any combination thereof). In some implementations, the processor 402 may be configured to operate the memory 404. In some other implementations, the memory 404 may be integrated into the processor 402. The processor 402 may be configured to execute computer-readable instructions stored in the memory 404 to cause the UE 400 to perform various functions of the present disclosure.

The memory 404 may include volatile or non-volatile memory. The memory 404 may store computer-readable, computer-executable code including instructions that, when executed by the processor 402, cause the UE 400 to perform various functions described herein. The code may be stored in a non-transitory computer-readable medium such the memory 404 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 402 and the memory 404 coupled with the processor 402 may be configured to cause the UE 400 to perform one or more of the UE functions described herein (e.g., executing, by the processor 402, instructions stored in the memory 404). Accordingly, the processor 402 may support wireless communication at the UE 400 in accordance with examples as disclosed herein.

For example, the UE 400 may be configured to support a means for storing a ML model and a set of ML parameters associated with the ML model. In some implementations, the ML model is jointly trained with a BS-based ML model in an end-to-end manner using a ZO SGD technique to minimize a total loss.

The UE 400 may be configured to support a means for receiving, from a base station, a training message comprising a first set of forward-pass values and a second set of forward-pass values, wherein the first set of forward-pass values corresponds to a first perturbation of the set of ML parameters in a positive direction and the second set of forward-pass values corresponds to a second perturbation of the set of ML parameters in a negative direction.

The UE 400 may be configured to support a means for determining a loss difference value based on a random vector and the training message. In some implementations, to determine the loss difference value, the UE 400 may be configured to calculate a first scalar value based on a set of training data and the first perturbation of the set of ML parameters, wherein the first scalar value indicates a first sum of a difference between a model output and a first inference output corresponding to the set of training data wherein the ML parameters are perturbed in the positive direction. In some implementations, to determine the loss difference value, the UE 400 may be configured to calculate a second scalar value based on the set of training data and the second perturbation of the set of ML parameters, wherein the second scalar value indicates a second sum of a difference between the model output and a second inference output corresponding to the set of training data wherein the ML parameters are perturbed in the negative direction.

The UE 400 may be configured to support a means for transmitting, to the base station, a feedback message comprising the loss difference value. The UE 400 may be configured to support a means for receiving, from the base station, an update message indicating a model update decision.

In some implementations, the UE 400 may be configured to update the set of ML model parameters based on the random vector in response to the model update decision indicating to update the ML model. In some implementations, the update message comprises a binary variable that indicates the model update decision and a scalar value that indicates a weighted sum of the set of loss difference values.

4 In certain implementations, the UE 400 may be configured to: A) input the first set of forward-pass values to the ML model to generate a first inference output; B) input the second set of forward-pass values to the ML model to generate a second inference output; C) calculate a first loss value based on a difference between the first inference output and a target output corresponding to the set of training data; and D) calculate a second loss value based on a difference between the second inference output and a target output corresponding to the set of training data. In such implementations, the loss difference value indicates a difference between the first loss value and the second loss value, scaled by a predetermined scaling factor.

In some implementations, the UE 400 may be configured to: A) generate a plurality of random vectors; B) calculate a plurality of loss difference values based on the plurality of random vectors; and C) select a respective random vector that maximizes or minimizes a respective loss difference value. For example, if the system consensus is to make "positive" values of loss differences, then the UE 400 finds the random vector that maximizes the loss difference value. Alternatively, if the system consensus is to make "negative" values of loss differences, then the UE 400 finds the random vector that minimizes the loss difference value.

In certain implementations, the UE 400 may be configured to generate each of the plurality of random vectors using a random seed without storing the random vectors in the at least one memory, and wherein each random vector has a same size as the set of ML parameters. In some implementations, the UE 400 may be configured to determine a system consensus for a loss difference direction, wherein the loss difference value is based on the loss difference direction.

The controller 406 may manage input and output signals for the UE 400. The controller 406 may also manage peripherals not integrated into the UE 400. In some implementations, the controller 406 may utilize an operating system (OS) such as iOS®, ANDROID®, WINDOWS®, or other operating systems. In some implementations, the controller 406 may be implemented as part of the processor 402.

In some implementations, the UE 400 may include at least one transceiver 408. In some other implementations, the UE 400 may have more than one transceiver 408. The transceiver 408 may represent a wireless transceiver. The transceiver 408 may include one or more receiver chains 410, one or more transmitter chains 412, or a combination thereof.

A receiver chain 410 may be configured to receive signals (e.g., control information, data, packets) over a wireless medium. For example, the receiver chain 410 may include one or more antennas for receiving the signal over the air or wireless medium. The receiver chain 410 may include at least one amplifier (e.g., a low-noise amplifier (LNA)) configured to amplify the received signal. The receiver chain 410 may include at least one demodulator configured to demodulate the received signal and obtain the transmitted data by reversing the modulation technique applied during transmission of the signal. The receiver chain 410 may include at least one decoder for decoding/processing the demodulated signal to receive the transmitted data.

A transmitter chain 412 may be configured to generate and transmit signals (e.g., control information, data, packets). The transmitter chain 412 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 412 may also include at least one power amplifier configured to amplify the modulated signal to an appropriate power level suitable for transmission over the wireless medium. The transmitter chain 412 may also include one or more antennas for transmitting the amplified signal into the air or wireless medium.

Figure 5:
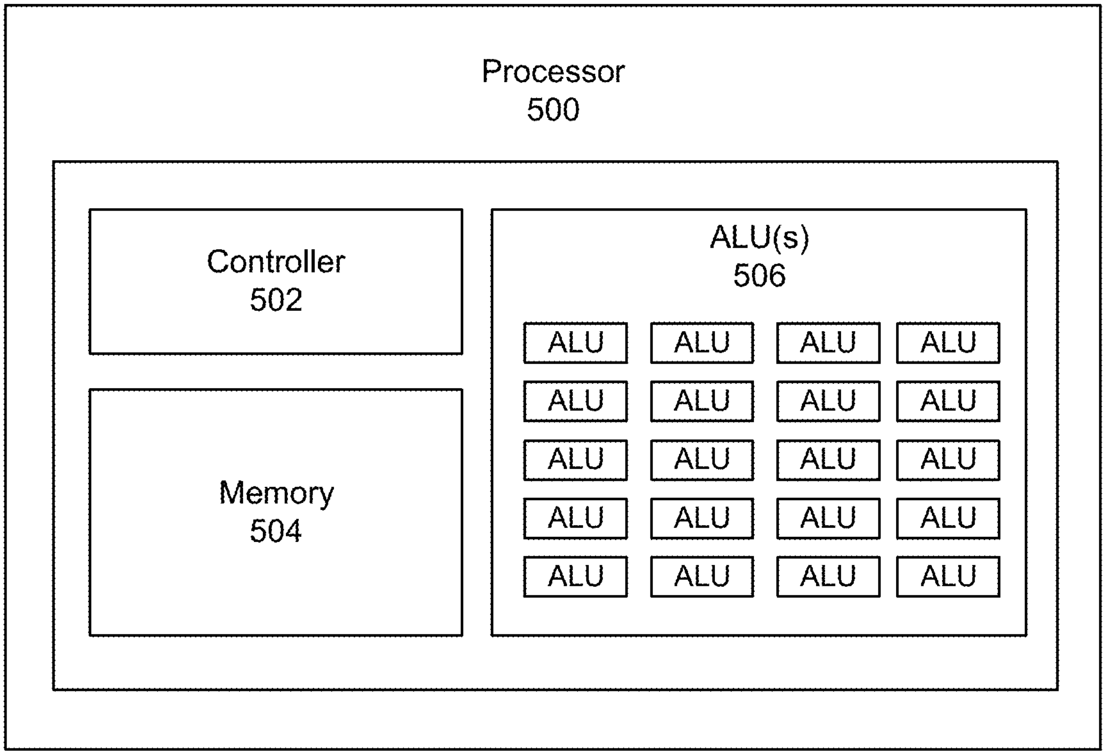
FIG. 5 illustrates an example of a processor in accordance with aspects of the present disclosure.

FIG. 5 illustrates an example of a processor 500 in accordance with aspects of the present disclosure. The processor 500 may be an example of a processor configured to perform various operations in accordance with examples as described herein. The processor 500 may include a controller 502 configured to perform various operations in accordance with examples as described herein. The processor 500 may optionally include at least one memory 504, which may be, for example, an L1/L2/L3 cache. Additionally, or alternatively, the processor 500 may optionally include one or more arithmetic-logic units (ALUs) 506. One or more of these components may be in electronic communication or otherwise coupled (e.g., operatively, communicatively, functionally, electronically, electrically) via one or more interfaces (e.g., buses).

The processor 500 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 500) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 502 may be configured to manage and coordinate various operations (e.g., signaling, receiving, obtaining, retrieving, transmitting, outputting, forwarding, storing, determining, identifying, accessing, writing, reading) of the processor 500 to cause the processor 500 to support various operations in accordance with examples as described herein. For example, the controller 502 may operate as a control unit of the processor 500, generating control signals that manage the operation of various components of the processor 500. These control signals include enabling or disabling functional units, selecting data paths, initiating memory access, and coordinating timing of operations.

The controller 502 may be configured to fetch (e.g., obtain, retrieve, receive) instructions from the memory 504 and determine subsequent instruction(s) to be executed to cause the processor 500 to support various operations in accordance with examples as described herein. The controller 502 may be configured to track memory address of instructions associated with the memory 504. The controller 502 may be configured to decode instructions to determine the operation to be performed and the operands involved. For example, the controller 502 may be configured to interpret the instruction and determine control signals to be output to other components of the processor 500 to cause the processor 500 to support various operations in accordance with examples as described herein. Additionally, or alternatively, the controller 502 may be configured to manage flow of data within the processor 500. The controller 502 may be configured to control transfer of data between registers, arithmetic logic units (ALUs), and other functional units of the processor 500.

The memory 504 may include one or more caches (e.g., memory local to or included in the processor 500 or other memory, such RAM, ROM, DRAM, SDRAM, SRAM, MRAM, flash memory, etc. In some implementations, the memory 504 may reside within or on a processor chipset (e.g., local to the processor 500). In some other implementations, the memory 504 may reside external to the processor chipset (e.g., remote to the processor 500).

The memory 504 may store computer-readable, computer-executable code including instructions that, when executed by the processor 500, cause the processor 500 to perform various functions described herein. The code may be stored in a non-transitory computer-readable medium such as system memory or another type of memory. The controller 502 and/or the processor 500 may be configured to execute computer-readable instructions stored in the memory 504 to cause the processor 500 to perform various functions. For example, the processor 500 and/or the controller 502 may be coupled with or to the memory 504, the processor 500, the controller 502, and the memory 504 may be configured to perform various functions described herein. In some examples, the processor 500 may include multiple processors and the memory 504 may include multiple memories. One or more of the multiple processors may be coupled with one or more of the multiple memories, which may, individually or collectively, be configured to perform various functions herein.

The one or more ALUs 506 may be configured to support various operations in accordance with examples as described herein. In some implementations, the one or more ALUs 506 may reside within or on a processor chipset (e.g., the processor 500). In some other implementations, the one or more ALUs 506 may reside external to the processor chipset (e.g., the processor 500). One or more ALUs 506 may perform one or more computations such as addition, subtraction, multiplication, and division on data. For example, one or more ALUs 506 may receive input operands and an operation code, which determines an operation to be executed. One or more ALUs 506 be configured with a variety of logical and arithmetic circuits, including adders, subtractors, shifters, and logic gates, to process and manipulate the data according to the operation. Additionally, or alternatively, the one or more ALUs 506 may support logical operations such as AND, OR, exclusive-OR (XOR), not-OR (NOR), and not-AND (NAND), enabling the one or more ALUs 506 to handle conditional operations, comparisons, and bitwise operations.

In various implementations, the processor 500 may support the functions of a UE, in accordance with examples as disclosed herein. For example, the processor 500 may be configured to support a means for storing a ML model and a set of ML parameters associated with the ML model. In some implementations, the ML model is jointly trained with a BS-based ML model in an end-to-end manner using a ZO SGD technique to minimize a total loss.

The processor 500 may be configured to support a means for receiving, from a base station, a training message comprising a first set of forward-pass values and a second set of forward-pass values, wherein the first set of forward-pass values corresponds to a first perturbation of the set of ML parameters in a positive direction and the second set of forward-pass values corresponds to a second perturbation of the set of ML parameters in a negative direction.

The processor 500 may be configured to support a means for determining a loss difference value based on a random vector and the training message. In some implementations, to determine the loss difference value, the processor 500 may be configured to calculate a first scalar value based on a set of training data and the first perturbation of the set of ML parameters, wherein the first scalar value indicates a first sum of a difference between a model output and a first inference output corresponding to the set of training data wherein the ML parameters are perturbed in the positive direction. In some implementations, to determine the loss difference value, the processor 500 may be configured to calculate a second scalar value based on the set of training data and the second perturbation of the set of ML parameters, wherein the second scalar value indicates a second sum of a difference between the model output and a second inference output corresponding to the set of training data wherein the ML parameters are perturbed in the negative direction.

The processor 500 may be configured to support a means for transmitting, to the base station, a feedback message comprising the loss difference value. The processor 500 may be configured to support a means for receiving, from the base station, an update message indicating a model update decision.

In some implementations, the processor 500 may be configured to update the set of ML model parameters based on the random vector in response to the model update decision indicating to update the ML model. In some implementations, the update message comprises a binary variable that indicates the model update decision and a scalar value that indicates a weighted sum of the set of loss difference values.

5 In certain implementations, the processor 500 may be configured to: A) input the first set of forward-pass values to the ML model to generate a first inference output; B) input the second set of forward-pass values to the ML model to generate a second inference output; C) calculate a first loss value based on a difference between the first inference output and a target output corresponding to the set of training data; and D) calculate a second loss value based on a difference between the second inference output and a target output corresponding to the set of training data. In such implementations, the loss difference value indicates a difference between the first loss value and the second loss value, scaled by a predetermined scaling factor.

In some implementations, the processor 500 may be configured to: A) generate a plurality of random vectors; B) calculate a plurality of loss difference values based on the plurality of random vectors; and C) select a respective random vector that maximizes or minimizes a respective loss difference value. For example, if the system consensus is to make "positive" values of loss differences, then the processor 500 finds the random vector that maximizes the loss difference value. Alternatively, if the system consensus is to make "negative" values of loss differences, then the processor 500 finds the random vector that minimizes the loss difference value.

In certain implementations, the processor 500 may be configured to generate each of the plurality of random vectors using a random seed without storing the random vectors in the at least one memory, and wherein each random vector has a same size as the set of ML parameters. In some implementations, the processor 500 may be configured to determine a system consensus for a loss difference direction, wherein the loss difference value is based on the loss difference direction.

In various implementations, the processor 500 may support the functions of a base station, in accordance with examples as disclosed herein. For example, the processor 500 may be configured to support a means for storing a ML model and a set of ML parameters associated with the ML model. In some implementations, the ML model is jointly trained with one or more UE-based ML models in an end-to-end manner using a ZO SGD technique to minimize a total loss.

The processor 500 may be configured to support a means for generating a first set of forward-pass values based on a first perturbation of the set of ML parameters by a random vector in a positive direction and for generating a second set of forward-pass values based on a second perturbation of the set of ML parameters by the random vector in a negative direction.

In some implementations, the processor 500 may be configured to input a set of training data to the ML model. In such implementations, to generate the first set of forward-pass values, the processor 500 may be configured to generate a forward-pass value per training input datum, and wherein to generate the second set of forward-pass values the processor 500 may be configured to generate a forward-pass value per training input datum.

In some implementations, the random vector is the same size as the set of ML parameters. In some implementations, the processor 500 may be configured to generate the random vector from a random seed without storing the random vector in the at least one memory.

The processor 500 may be configured to support a means for transmitting a set of training messages to a corresponding set of UEs, wherein each training message comprises the first set of forward-pass values and the second set of forward-pass values. In some implementations, the ML model comprises multiple layers, and the first set of forward-pass values and the second set of forward-pass values correspond to scalar values of outputs in a final layer of the ML model.

The processor 500 may be configured to support a means for receiving a set of loss difference values, wherein each loss difference value is associated with a UE of the set of UEs. In some implementations, the processor 500 may be configured to determine a system consensus for a loss difference direction, wherein the set of loss difference values is based on the loss difference direction.

The processor 500 may be configured to support a means for determining a model update decision based on the set of loss difference values. The processor 500 may be configured to support a means for transmitting, to the set of UEs, an update message indicating the model update decision. In some implementations, the processor 500 may be configured to update the set of ML model parameters based on the random vector in response to determining to update the ML model.

In some implementations, the processor 500 may be configured to determine a weighted sum of the set of loss difference values, and wherein the update message comprises a binary variable that indicates the model update decision and a scalar value that indicates the weighted sum of the set of loss difference values.

In certain implementations, the processor 500 may be configured to determine a weight of each UE of the set of UEs based on UE feedback information. In such implementations, the UE feedback information may include channel quality information, low latency requirements, and the like. The BS conventionally receives information from the UEs as a form of feedback, i.e., UE feedback information. This UE feedback information may contain the information about channel quality of the UE and a message that requests the low latency transmission to the BS.

Figure 6:
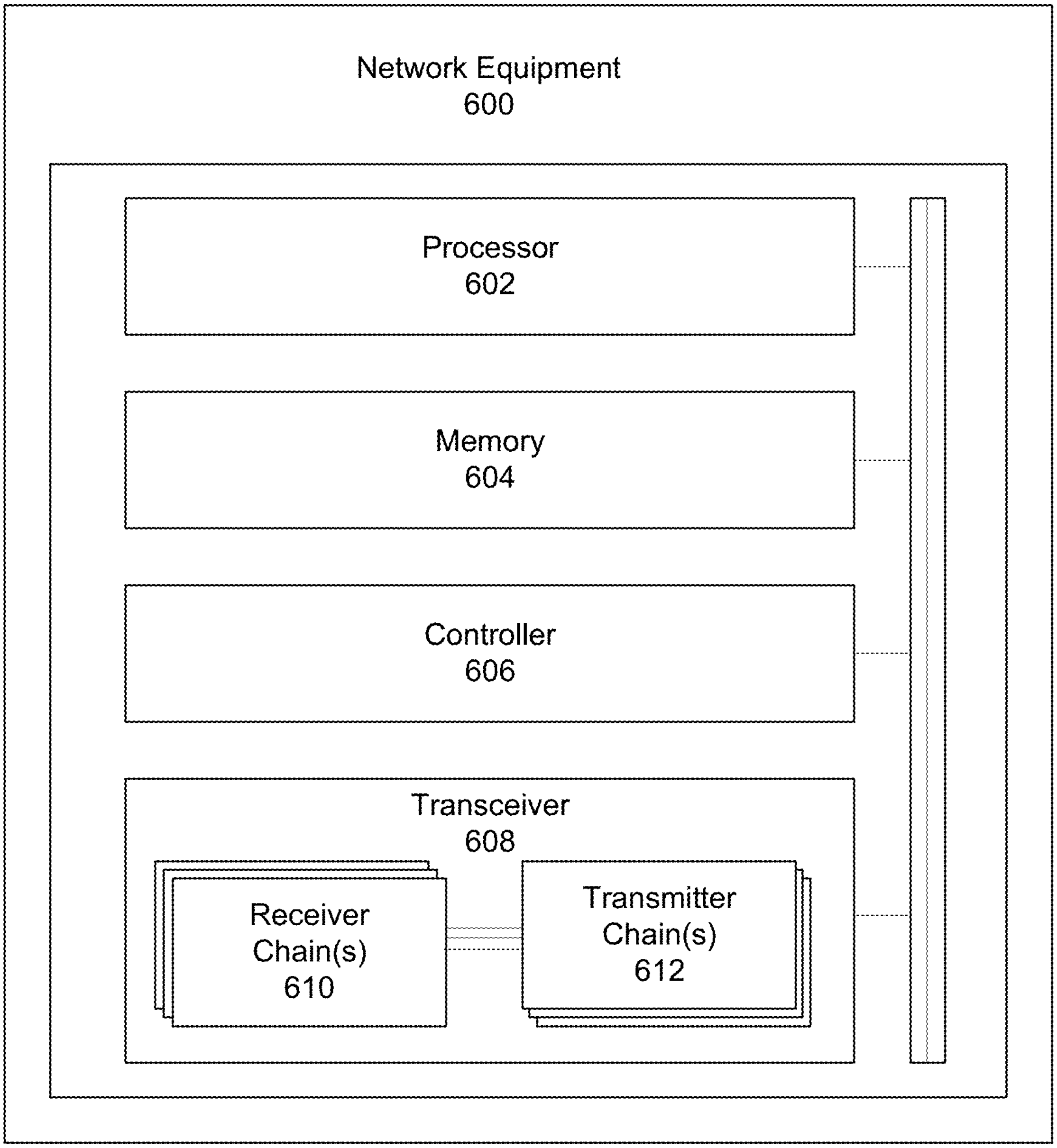
FIG. 6 illustrates an example of a NE in accordance with aspects of the present disclosure.

FIG. 6 illustrates an example of an NE 600 in accordance with aspects of the present disclosure. The NE 600 may include a processor 602, a memory 604, a controller 606, and a transceiver 608. The processor 602, the memory 604, the controller 606, or the transceiver 608, or various combinations thereof or various components thereof may be examples of means for performing various aspects of the present disclosure as described herein. These components may be coupled (e.g., operatively, communicatively, functionally, electronically, electrically) via one or more interfaces.

The processor 602, the memory 604, the controller 606, or the transceiver 608, or various combinations or components thereof may be implemented in hardware (e.g., circuitry). The hardware may include a processor, a DSP, an ASIC, or other programmable logic device, or any combination thereof configured as or otherwise supporting a means for performing the functions described in the present disclosure.

The processor 602 may include an intelligent hardware device (e.g., a general-purpose processor, a DSP, a CPU, an ASIC, an FPGA, or any combination thereof). In some implementations, the processor 602 may be configured to operate the memory 604. In some other implementations, the memory 604 may be integrated into the processor 602. The processor 602 may be configured to execute computer-readable instructions stored in the memory 604 to cause the NE 600 to perform various functions of the present disclosure.

The memory 604 may include volatile or non-volatile memory. The memory 604 may store computer-readable, computer-executable code including instructions when executed by the processor 602 cause the NE 600 to perform various functions described herein. The code may be stored in a non-transitory computer-readable medium such the memory 604 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 602 and the memory 604 coupled with the processor 602 may be configured to cause the NE 600 to perform one or more base station functions as described herein (e.g., executing, by the processor 602, instructions stored in the memory 604). Accordingly, the processor 602 may support the communication at the NE 600 in accordance with examples as disclosed herein.

For example, the NE 600 may be configured to support a means for storing a ML model and a set of ML parameters associated with the ML model. In some implementations, the ML model is jointly trained with one or more UE-based ML models in an end-to-end manner using a ZO SGD technique to minimize a total loss.

The NE 600 may be configured to support a means for generating a first set of forward-pass values based on a first perturbation of the set of ML parameters by a random vector in a positive direction and for generating a second set of forward-pass values based on a second perturbation of the set of ML parameters by the random vector in a negative direction.

In some implementations, the NE 600 may be configured to input a set of training data to the ML model. In such implementations, to generate the first set of forward-pass values, the NE 600 may be configured to generate a forward-pass value per training input datum, and wherein to generate the second set of forward-pass values the NE 600 may be configured to generate a forward-pass value per training input datum.

In some implementations, the random vector is the same size as the set of ML parameters. In some implementations, the NE 600 may be configured to generate the random vector from a random seed without storing the random vector in the at least one memory.

The NE 600 may be configured to support a means for transmitting a set of training messages to a corresponding set of UEs, wherein each training message comprises the first set of forward-pass values and the second set of forward-pass values. In some implementations, the ML model comprises multiple layers, and the first set of forward-pass values and the second set of forward-pass values correspond to scalar values of outputs in a final layer of the ML model.

The NE 600 may be configured to support a means for receiving a set of loss difference values, wherein each loss difference value is associated with a UE of the set of UEs. In some implementations, the NE 600 may be configured to determine a system consensus for a loss difference direction, wherein the set of loss difference values is based on the loss difference direction.

The NE 600 may be configured to support a means for determining a model update decision based on the set of loss difference values. The NE 600 may be configured to support a means for transmitting, to the set of UEs, an update message indicating the model update decision. In some implementations, the NE 600 may be configured to update the set of ML model parameters based on the random vector in response to determining to update the ML model.

In some implementations, the NE 600 may be configured to determine a weighted sum of the set of loss difference values, and wherein the update message comprises a binary variable that indicates the model update decision and a scalar value that indicates the weighted sum of the set of loss difference values.

In certain implementations, the NE 600 may be configured to determine a weight of each UE of the set of UEs based on UE feedback information. In such implementations, the UE feedback information may include channel quality information, low latency requirements, and the like. The NE 600 conventionally receives information from the UEs as a form of feedback, i.e., UE feedback information. This UE feedback information may contain the information about channel quality of the UE and a message that requests the low latency transmission to the NE 600.

The controller 606 may manage input and output signals for the NE 600. The controller 606 may also manage peripherals not integrated into the NE 600. In some implementations, the controller 606 may utilize an operating system such as iOS®, ANDROID®, WINDOWS®, or other operating systems. In some implementations, the controller 606 may be implemented as part of the processor 602.

In some implementations, the NE 600 may include at least one transceiver 608. In some other implementations, the NE 600 may have more than one transceiver 608. The transceiver 608 may represent a wireless transceiver. The transceiver 608 may include one or more receiver chains 610, one or more transmitter chains 612, or a combination thereof.

A receiver chain 610 may be configured to receive signals (e.g., control information, data, packets) over a wireless medium. For example, the receiver chain 610 may include one or more antennas for receiving the signal over the air or wireless medium. The receiver chain 610 may include at least one amplifier (e.g., a low-noise amplifier (LNA)) configured to amplify the received signal. The receiver chain 610 may include at least one demodulator configured to demodulate the received signal and obtain the transmitted data by reversing the modulation technique applied during transmission of the signal. The receiver chain 610 may include at least one decoder for decoding/processing the demodulated signal to receive the transmitted data.

A transmitter chain 612 may be configured to generate and transmit signals (e.g., control information, data, packets). The transmitter chain 612 may include at least one modulator for modulating data onto a carrier signal, preparing the signal for transmission over a wireless medium. The at least one modulator may be configured to support one or more techniques such as AM, FM, or digital modulation schemes like PSK or QAM. The transmitter chain 612 may also include at least one power amplifier configured to amplify the modulated signal to an appropriate power level suitable for transmission over the wireless medium. The transmitter chain 612 may also include one or more antennas for transmitting the amplified signal into the air or wireless medium.

Figure 7:
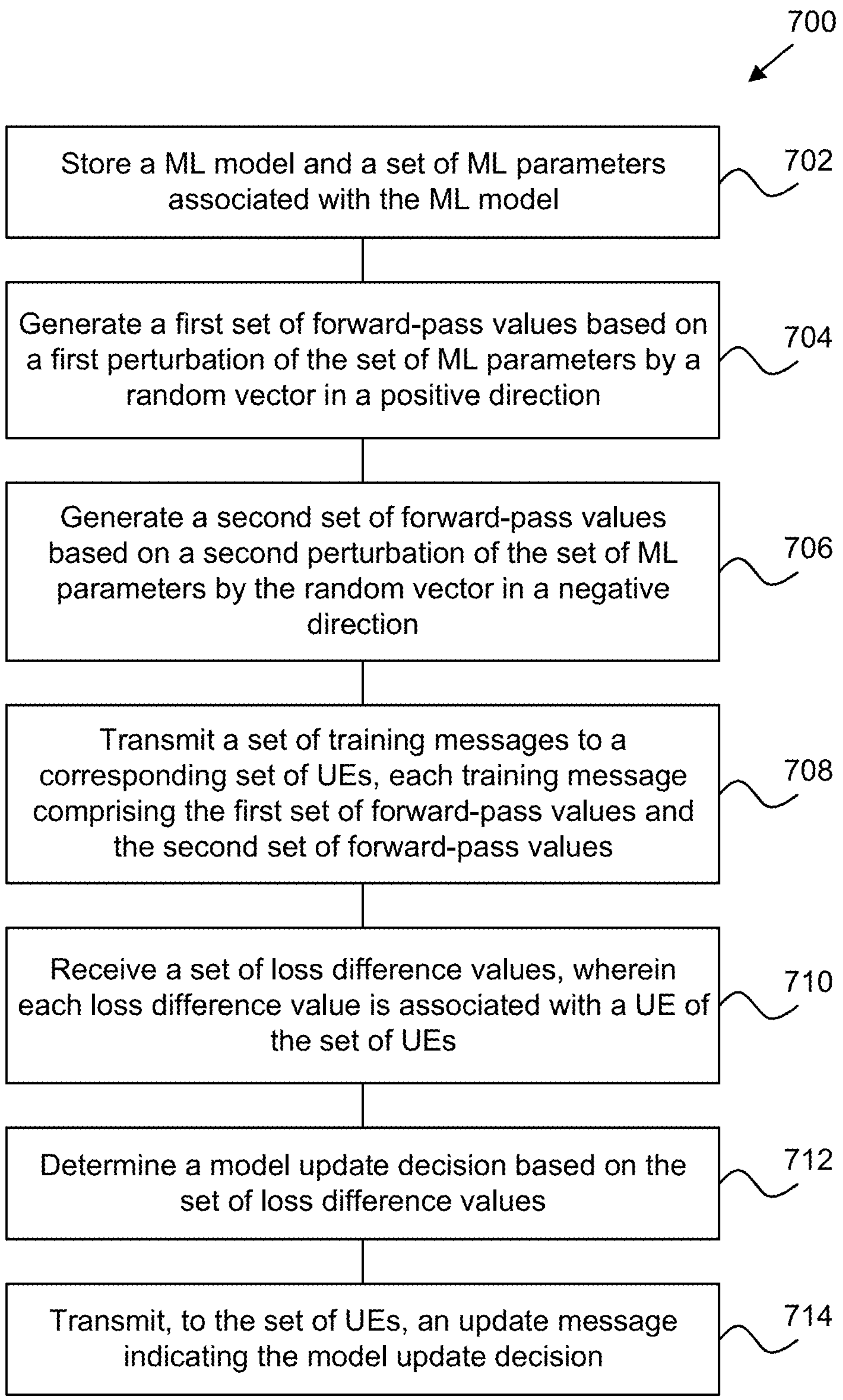
FIG. 7 illustrates a flowchart of a method performed by a NE in accordance with aspects of the present disclosure.

FIG. 7 depicts one embodiment of a method 700 in accordance with aspects of the present disclosure. In various embodiments, the operations of the method 700 may be implemented by a base station, as described herein. In some implementations, the base station may execute a set of instructions to control the function elements of the base station to perform the described functions.

At step 702, the method 700 may include storing a ML model and a set of ML parameters associated with the ML model. The operations of step 702 may be performed in accordance with examples as described herein. In some implementations, aspects of the operations of step 702 may be performed by an NE, as described with reference to FIG. 6.

At step 704, the method 700 may include generating a first set of forward-pass values based on a first perturbation of the set of ML parameters by a random vector in a positive direction. The operations of step 704 may be performed in accordance with examples as described herein. In some implementations, aspects of the operations of step 704 may be performed by an NE, as described with reference to FIG. 6.

At step 706, the method 700 may include generating a second set of forward-pass values based on a second perturbation of the set of ML parameters by the random vector in a negative direction. The operations of step 706 may be performed in accordance with examples as described herein. In some implementations, aspects of the operations of step 706 may be performed by a NE, as described with reference to FIG. 6.

At step 708, the method 700 may include transmitting a set of training messages to a corresponding set of UEs, wherein each training message comprises the first set of forward-pass values and the second set of forward-pass values. The operations of step 708 may be performed in accordance with examples as described herein. In some implementations, aspects of the operations of step 708 may be performed by a NE, as described with reference to FIG. 6.

At step 710, the method 700 may include receiving a set of loss difference values, wherein each loss difference value is associated with a UE of the set of UEs. The operations of step 710 may be performed in accordance with examples as described herein. In some implementations, aspects of the operations of step 710 may be performed by a NE, as described with reference to FIG. 6.

At step 712, the method 700 may include determining a model update decision based on the set of loss difference values. The operations of step 712 may be performed in accordance with examples as described herein. In some implementations, aspects of the operations of step 712 may be performed by a NE, as described with reference to FIG. 6.

At step 714, the method 700 may include transmitting, to the set of UEs, an update message indicating the model update decision. The operations of step 714 may be performed in accordance with examples as described herein. In some implementations, aspects of the operations of step 714 may be performed by a NE, as described with reference to FIG. 6.

It should be noted that the method 700 described herein describes one possible implementation, and that the operations and the steps may be rearranged or otherwise modified and that other implementations are possible.

Figure 8:
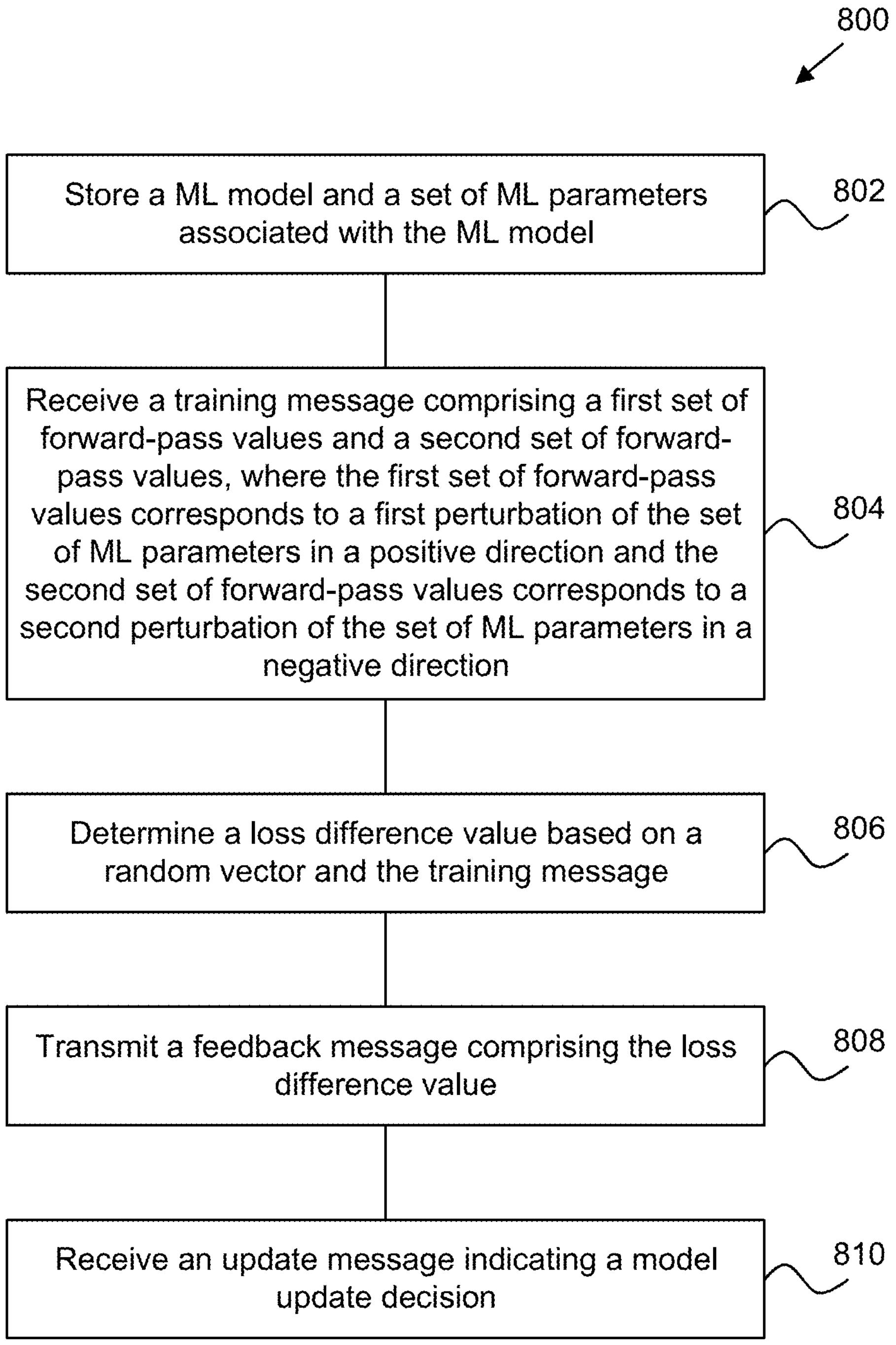
FIG. 8 illustrates a flowchart of a method performed by a UE in accordance with aspects of the present disclosure.

FIG. 8 depicts one embodiment of a method 800 in accordance with aspects of the present disclosure. In various embodiments, the operations of the method 800 may be implemented by a UE, as described herein. In some implementations, the UE may execute a set of instructions to control the function elements of the UE to perform the described functions.

At step 802, the method 800 may include storing a ML model and a set of ML parameters associated with the ML model. The operations of step 802 may be performed in accordance with examples as described herein. In some implementations, aspects of the operation of step 802 may be performed by a UE, as described with reference to FIG. 4.

At step 804, the method 800 may include receiving, e.g., from a BS, a training message comprising a first set of forward-pass values and a second set of forward-pass values, wherein the first set of forward-pass values corresponds to a first perturbation of the set of ML parameters in a positive direction and the second set of forward-pass values corresponds to a second perturbation of the set of ML parameters in a negative direction. The operations of step 804 may be performed in accordance with examples as described herein. In some implementations, aspects of the operation of step 804 may be performed by a UE, as described with reference to FIG. 4.

At step 806, the method 800 may include determining a loss difference value based on a random vector and the training message. The operations of step 806 may be performed in accordance with examples as described herein. In some implementations, aspects of the operation of step 806 may be performed by a UE, as described with reference to FIG. 4.

At step 808, the method 800 may include transmitting, e.g., to the BS, a feedback message comprising the loss difference value. The operations of step 808 may be performed in accordance with examples as described herein. In some implementations, aspects of the operation of step 808 may be performed by a UE, as described with reference to FIG. 4.

At step 810, the method 800 may include receiving, e.g., from the BS, an update message indicating a model update decision. The operations of step 810 may be performed in accordance with examples as described herein. In some implementations, aspects of the operations of step 810 may be performed by a UE, as described with reference to FIG. 4.

It should be noted that the method 800 described herein describes one possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A base station for wireless communication, comprising:
at least one memory configured to store a machine learning (ML) model and a set of ML parameters associated with the ML model; and
at least one processor coupled with the at least one memory and configured to cause the base station to:
generate a first set of forward-pass values based on a first perturbation of the set of ML parameters by a random vector in a positive direction;
generate a second set of forward-pass values based on a second perturbation of the set of ML parameters by the random vector in a negative direction;
transmit a set of training messages to a corresponding set of user equipments (UEs), wherein each training message comprises the first set of forward-pass values and the second set of forward-pass values;
receive a set of loss difference values, wherein each loss difference value is associated with a UE of the set of UEs;
determine a model update decision based on the set of loss difference values; and
transmit, to the set of UEs, an update message indicating the model update decision.

2. The base station of claim 1, wherein the at least one processor is configured to cause the base station to generate the random vector from a random seed without storing the random vector in the at least one memory, and wherein the random vector has a same size as the set of ML parameters.

3. The base station of claim 1, wherein the at least one processor is configured to cause the base station to input a set of training data to the ML model, wherein to generate the first set of forward-pass values the at least one processor is configured to cause the base station to generate a forward-pass value per training input datum, and wherein to generate the second set of forward-pass values the at least one processor is configured to cause the base station to generate a forward-pass value per training input datum.

4. The base station of claim 1, wherein the ML model comprises multiple layers, and wherein the first set of forward-pass values and the second set of forward-pass values correspond to scalar values of outputs in a final layer of the ML model.

5. The base station of claim 1, wherein the at least one processor is configured to cause the base station to determine a weighted sum of the set of loss difference values, and wherein the update message comprises a binary variable that indicates the model update decision and a scalar value that indicates the weighted sum of the set of loss difference values.

6. The base station of claim 5, wherein the at least one processor is configured to cause the base station to determine a weight of each UE of the set of UEs based on UE feedback information.

7. The base station of claim 1, wherein the at least one processor is configured to cause the base station to update the set of ML model parameters based on the random vector in response to determining to update the ML model.

8. The base station of claim 1, wherein the at least one processor is configured to cause the base station to determine a system consensus for a loss difference direction, wherein the set of loss difference values is based on the loss difference direction.

9. The base station of claim 1, wherein the ML model is jointly trained with one or more UE-based ML models in an end-to-end manner using zeroth order stochastic gradient decent (ZO SGD) technique to minimize a total loss.

10. A method performed by a base station, the method comprising:
storing a machine learning (ML) model and a set of ML parameters associated with the ML model;
generating a first set of forward-pass values based on a first perturbation of the set of ML parameters by a random vector in a positive direction;
generating a second set of forward-pass values based on a second perturbation of the set of ML parameters by the random vector in a negative direction;
transmitting a set of training messages to a corresponding set of user equipments (UEs), wherein each training message comprises the first set of forward-pass values and the second set of forward-pass values;
receiving a set of loss difference values, wherein each loss difference value is associated with a UE of the set of UEs;
determining a model update decision based on the set of loss difference values; and
transmitting, to the set of UEs, an update message indicating the model update decision.

11. A user equipment (UE) for wireless communication, comprising:
at least one memory; and
at least one processor coupled with the at least one memory and configured to cause the UE to:
store a machine learning (ML) model and a set of ML parameters associated with the ML model;
receive, from a base station, a training message comprising a first set of forward-pass values and a second set of forward-pass values, wherein the first set of forward-pass values corresponds to a first perturbation of the set of ML parameters in a positive direction and the second set of forward-pass values corresponds to a second perturbation of the set of ML parameters in a negative direction;
determine a loss difference value based on a random vector and the training message;
transmit, to the base station, a feedback message comprising the loss difference value; and
receive, from the base station, an update message indicating a model update decision.

12. The UE of claim 11, wherein to determine the loss difference value, the at least one processor is configured to cause the UE to:
calculate a first scalar value based on a set of training data and the first perturbation of the set of ML parameters, wherein the first scalar value indicates a first sum of a difference between a model output and a first inference output corresponding to the set of training data wherein the ML parameters are perturbed in the positive direction; and
calculate a second scalar value based on the set of training data and the second perturbation of the set of ML parameters, wherein the second scalar value indicates a second sum of a difference between the model output and a second inference output corresponding to the set of training data wherein the ML parameters are perturbed in the negative direction.

13. The UE of claim 12, wherein the at least one processor is configured to cause the UE to:

input the first set of forward-pass values to the ML model to generate a first inference output;

input the second set of forward-pass values to the ML model to generate a second inference output;

calculate a first loss value based on a difference between the first inference output and a target output corresponding to the set of training data; and calculate a second loss value based on a difference between the second inference output and a target output corresponding to the set of training data, wherein the loss difference value indicates a difference between the first loss value and the second loss value, scaled by a predetermined scaling factor.

14. The UE of claim 11, wherein the at least one processor is configured to cause the UE to:

generate a plurality of random vectors;

calculate a plurality of loss difference values based on the plurality of random vectors; and select a respective random vector that maximizes or minimizes a respective loss difference value.

15. The UE of claim 14, wherein the at least one processor is configured to cause the UE to generate each of the plurality of random vectors using a random seed without storing the random vectors in the at least one memory, and wherein each random vector has a same size as the set of ML parameters.

16. The UE of claim 11, wherein the update message comprises a binary variable that indicates the model update decision and a scalar value that indicates a weighted sum of the set of loss difference values.

17. The UE of claim 11, wherein the at least one processor is configured to cause the UE to update the set of ML model parameters based on the random vector in response to the model update decision indicating to update the ML model.

18. The UE of claim 11, wherein the at least one processor is configured to cause the UE to determine a system consensus for a loss difference direction, wherein the loss difference value is based on the loss difference direction.

19. The UE of claim 11, wherein the ML model is jointly trained with a base station ML model in an end-to-end manner using zeroth order stochastic gradient decent (ZO SGD) technique to minimize a total loss.

20. A processor for wireless communications, comprising:

at least one controller coupled with at least one memory and configured to cause the processor to:

store a machine learning (ML) model and a set of ML parameters associated with the ML model;

receive, from a base station, a training message comprising a first set of forward-pass values and a second set of forward-pass values, wherein the first set of forward-pass values corresponds to a first perturbation of the set of ML parameters in a positive direction and the second set of forward-pass values corresponds to a second perturbation of the set of ML parameters in a negative direction;

determine a loss difference value based on a random vector and the training message;

transmit, to the base station, a feedback message comprising the loss difference value; and receive, from the base station, an update message indicating a model update decision.

* * * * *